United States Patent [19]
Wootton

[11] Patent Number: 4,465,896
[45] Date of Patent: Aug. 14, 1984

[54] FILAMENTARY TENSIONED INSULATING SUPPORT FOR A HIGH VOLTAGE CONDUCTOR AND METHOD OF MAKING SAME

[75] Inventor: Roy E. Wootton, Murrysville, Pa.
[73] Assignee: Westinghouse Electric Corp., Pittsburgh, Pa.
[21] Appl. No.: 445,595
[22] Filed: Nov. 29, 1982
[51] Int. Cl.³ .................. H02G 5/06; H01B 9/04; H01B 9/06; H01B 13/00
[52] U.S. Cl. .................................. 174/28; 29/828; 138/114; 174/99 B
[58] Field of Search ............... 174/14 R, 16 B, 27, 174/28, 29, 99 R, 99 B, 99 E; 29/825, 828; 138/112, 113, 114, 148; 156/47

[56] References Cited

U.S. PATENT DOCUMENTS

| | | | |
|---|---|---|---|
| 1,873,477 | 8/1932 | Quarles | 174/28 |
| 2,198,405 | 4/1940 | Cords | 174/28 |
| 3,110,324 | 11/1963 | DeHaan | 138/148 |
| 3,706,208 | 12/1972 | Kadi et al. | 138/114 X |

FOREIGN PATENT DOCUMENTS

| | | | |
|---|---|---|---|
| 1162918 | 2/1964 | Fed. Rep. of Germany | 174/99 B |
| 489007 | 7/1938 | United Kingdom | 174/29 |

Primary Examiner—Laramie E. Askin
Attorney, Agent, or Firm—M. S. Yatsko

[57] ABSTRACT

A gas insulated transmission line includes a hollow outer conductor having an inner conductor and a support framework disposed therein. A tensioned insulating member is utilized to support the inner conductor within the outer conductor and the support framework. The insulating member is made of flexible insulating filaments which are tensioned to a predetermined amount which is greater than the tension caused by suspending the weight of the inner conductor alone.

30 Claims, 14 Drawing Figures

FILAMENTARY TENSIONED INSULATING SUPPORT FOR A HIGH VOLTAGE CONDUCTOR AND METHOD OF MAKING SAME

BACKGROUND OF THE INVENTION

1. Field of the Invention

The invention relates in general to electrical equipment and in particular to gas insulated transmission lines having a tensioned insulating means for suspending one or more inner conductors within an outer conductor.

2. Description of the Prior Art

A common insulator used for supporting one or more inner high voltage conductors centrally within the outer conductor of a compressed gas insulated transmission line as well as for supporting any high voltage conductor is the cast insulator which is cast in place around the inner or high voltage conductor or onto a thin metal sleeve which is secured to the inner or other high voltage conductor. A material, such as filled epoxy, is usually selected which has a coefficient of expansion similar to the metal selected for the inner or high voltage conductor so as to minimize the possibility of voids being formed at the critical interface where the insulator meets the conductor. This is because such voids are subjected to high electrical stress at the critical insulator/conductor interface region, which can lead to ionization within the voids, flashover and reduced life expectancy for the insulator. This high voltage electrical field at this critical region approaches a value equal to the product of the field at the inner or high voltage conductor and the dielectric constant of the insulator. From this it can be seen that selection of an insulator material with a low dielectric constant would have advantages. In the prior art, however, epoxy, which has a relatively high dielectric constant of typically four to five, is generally used because it (1) has a coefficient of thermal expansion compatable with the conductor materials to reduce void formations, (2) has necessary mechanical strength, (3) is an arc resistant material, (4) does not carbonize on arcing and (5) can be vacuum cast without internal cavities. Voids at the critical interface region are usually avoided during the production of the insulator provided proper precautions and procedures such as vacuum casting and curing of the cast insulator around the inner conductor are utilized. Other special formulations and proprietary composition materials with lower dielectric constants dielectric constants in the range of approximately two to three, have not been successfully molded or cast around typical inner or high voltage conductors without creating voids since they have much higher coefficients of thermal expansion. Insulators made from these low dielectric constant materials have been produced by injection molding methods, and have been used successfully as insulators in gas insulated equipment provided the insulator utilizes a conducting layer at the conductor interface and/or has shielding rings proximate this region. Metallizing the insulator interface surface is expensive and the metallization is subject to flaking, the voids then formed being subject to the same increased field as at the critical conductor/insulator interface. Other methods such as the use of metallized recesses or nonmetallized recesses with insulating gases introduced in them have been used or proposed to defeat this problem of the high field at this critical region.

Solid insulators such as described above utilized for supporting the inner or high voltage conductor within or spaced from an outer or low voltage conductor are also subject to tracking and treeing, two phenomena due to the high field they are operating in, which cause a conductive carbon path to form on the outside surface or within the solid insulator, thereby destroying the insulator and causing flashover, a short circuit of the gas insulated transmission equipment in which the insulator is used. Accordingly, various methods have been proposed to eliminate the electric field lines going completely through the solid insulators, but rather crossing a gap of the insulating gas utilized for the equipment. Various methods to accomplish this end have included utilizing large gas filled recesses within the solid insulators, radially spacing the inner and outer conductor contact members of the insulator so as to provide an insulating gas gap, and cone or double cone insulators extending from an inner conductor at the apex of the cone along a predetermined angle to the outer conductor at the base of the cone, which predetermined angle is usually greater the more acute the field intensity at the region in question. The disadvantage of these arrangements to provide a gaseous insulation medium along with the solid insulation medium is that the increased electrical property of the solid insulator that is created because of the larger insulating gas gap is accompanied by a corresponding reduction in the mechanical strength of the insulator. A high mechanical strength is necessary to withstand short circuit forces which the gas insulated transmission line or the gas insulated equipment may be subjected to. Accordingly, it would be desirable to have an insulating means for gas insulated transmission lines and other fluid or vacuum insulated equipment for providing gaseous or other fluid or vacuum insulation mediums across an appreciable portion of the radial (or whatever direction for other electrical devices) distance between the low and high voltage conductors without sacrificing the mechanical strength of the insulating means.

SUMMARY OF THE INVENTION

Briefly, the present invention is a gas insulated transmission line including a hollow outer conductor, an inner conductor disposed interiorly within the outer conductor, an insulating gas disposed within the annular space between the outer and the inner conductors, and an insulating means disposed between the outer and inner conductors at a predetermined location for suspending the inner conductor within the outer conductor by an insulating member or cable in tension. The tensioned insulating member or cable comprises a plurality of insulating filaments surrounded by a vented insulating tubing material for protecting the insulating filaments from arcs within the gas insulated transmission line. The vents of the tubing permit the insulating gas to enter the interstices between the insulating filaments. The tensioned insulating member or cable is disposed between the inner and outer conductor or between the inner conductor and a securing framework to suspend the inner conductor with tension components in opposite directions so as to restrain the inner conductor from movement in any radial direction while still permitting limited axial movement to provide for temperature differential expansion and contraction of the inner and outer conductors without undue axial stress placed upon the structural elements of the gas insulated transmission line. The inner conductor of the gas insulated transmission line has two adjacent regions of reduced radius disposed proximate the axial location of either side of the cable securing framework so as to produce two regions of reduced electric field at the critical insulating cable/inner conductor interface. The tensioned insulating member or cable is wrapped around the inner conductor to cradle the surface of a predetermined radial angle of the inner conductor. Multiple wraps of the tensioned insulating member or cable are disposed so as to approximate two planes perpendicular to the inner conductor at the location of each of the reduced diameter portions of the inner conductor. The tensioned insulating member or cable within the two approximately perpendicular planes or cones is joined by wrapping the insulating member or cable over the securing framework in a direction parallel to the inner conductor. A supporting web of insulating cable at the two approximately perpendicular planes provides multiple cradles so as to provide balanced tension components in opposite directions to provide for suspending the inner conductor concentrically within the outer conductor. In one preferred embodiment of the invention the inner conductor is cradled through a radial angle of 60° at one reduced diameter portion of the inner conductor and 120° at the other reduced diameter portion of the inner conductor. The tensioned insulating cable is wrapped so as to suspend the inner conductor concentrically within the outer conductor by means of a method invention comprising securing one end of the cable at a predetermined location along the securing framework, securing the inner conductor within the securing framework by means of a removable jig, and wrapping the insulating cable in either a clockwise or counterclockwise rotation while reciprocally rotating the inner conductor and framework apparatus through a first predetermined radial angle and then a second predetermined radial angle in the opposite direction so as to provide the two web-like arrangements of tensioned insulating cable in the two approximately perpendicular planes or cones at the locations of the reduced inner conductor. The teachings of the invention are broadly applicable to supporting a conductor within a support member by an insulating means disposed between the conductor on the support means for suspending the conductor within the support means of an insulating member tensioned to a predetermined amount greater than the tension caused by suspending the weight of the conductor alone.

BRIEF DESCRIPTION OF THE DRAWINGS

The invention may be understood and further advantages and uses thereof more readily appreciated when considered in view of the following detailed description of the exemplary embodiments, taken with the accompanying drawings, in which.

DESCRIPTION OF THE PREFERRED EMBODIMENTS

Figure 1:
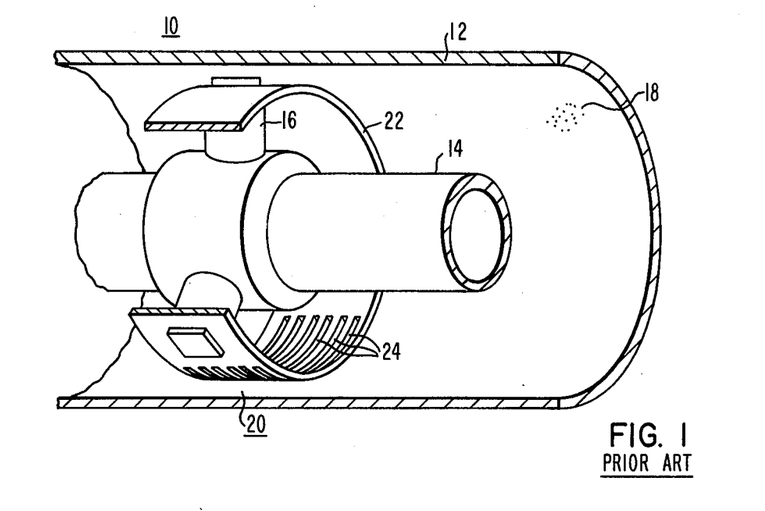
FIG. 1 is a pictorial view of a gas insulated transmission line constructed according to the teachings of the prior art.

Referring now to the drawings and to FIG. 1 in particular, there is shown a pictorial view of a gas insulated transmission line 10 of the prior art showing in elevation a typical cast insulator of the prior art as well as the surrounding particle trap and a portion of the inner conductor supported by the insulator. Gas insulated transmission line 10 includes an elongated, cylindrical outer sheath or outer conductor 12 and an elongated inner conductor 14 disposed within and spaced apart from the outer conductor 12. The outer sheath or outer conductor 12 will typically be at low or ground electrical potential, whereas the inner conductor 14 will be at high electrical potential with respect to the outer sheath 12, and may typically carry voltages in the range 138-1200 KV. Insulatably supporting the inner conductor 14 within the outer sheath or outer conductor 12 are a plurality of supporting insulators 16 and electrically insulating the inner conductor 14 from the outer conductor 12 is insulating gas 18, typical of which is sulfur hexafluoride at pressures of approximately 50 pounds per square inch gage. Support insulator 16 is illustrated as a tri-post design, although alternate support insulators, such as, for example, disc or conically shaped, are also typical support insulators of the prior art. Providing low field regions 20 adjacent to the insulating spacers 16 are particle trapping rings 22 having apertures 24 to facilitate entry of particles into the low field regions 20. The inner conductor 14, the outer conductor or outer sheath 12, and the particle trapping rings 22 will typically be of good electrically conducting materials such as aluminum.

Cast electrical insulators of the prior art such as, for example, insulator 16 of FIG. 1, when subjected to the high electrical fields of gas insulated transmission lines are subject to the electrical breakdown phenomena of surface tracking and internal treeing referred to earlier.

Means practiced in the prior art of avoiding such breakdown included having large recesses filled with the insulating gas and other means of providing a gas filled medium across a significant portion of the insulator's radial length in order to prevent electrical field lines extending solely within a solid insulator between the inner and outer conductors and to reduce the field magnitude in the plane of the insulator surface. As mentioned earlier, these alternate insulator structures, while they increased the electrical strength of the insulator, correspondingly reduced the mechanical strength of the insulator.

Figure 2:
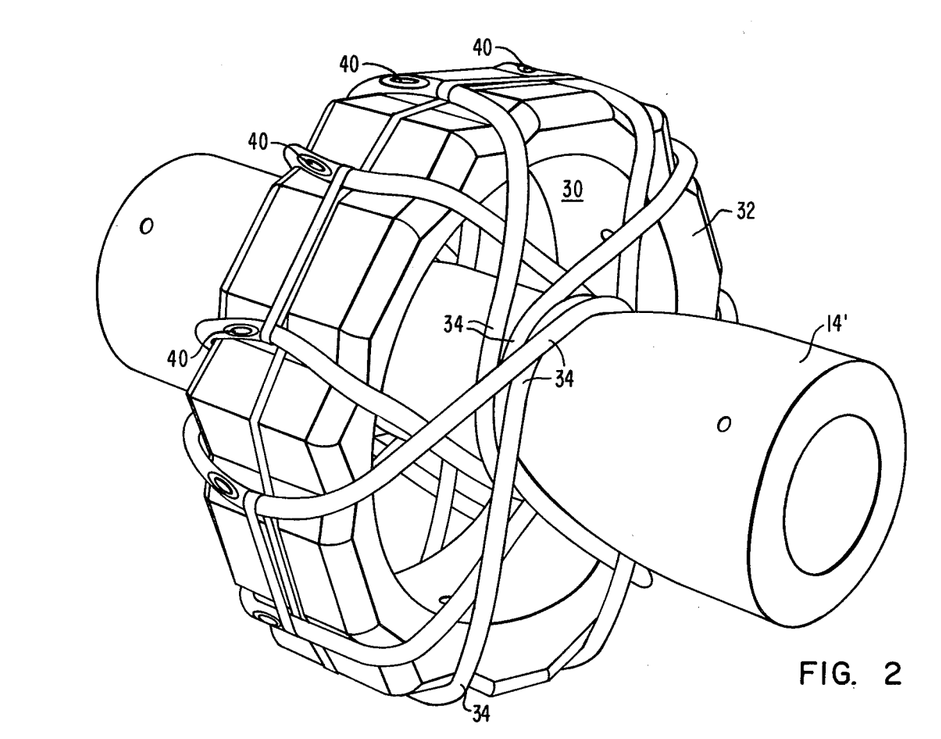
FIG. 2 is an orthogonal view of a portion of an inner conductor, a support member and the insulating means constructed according to the teachings of the present invention which may be used to replace the cast insulator of the gas insulated transmission line of FIG. 1.

Referring now to FIG. 2 there is shown a novel insulating means 30 disposed between a support member 32 and inner conductor 14' for suspending inner conductor 14' coaxially within support member 32 by an insulating member 34 tensioned to a predetermined amount greater than the tension caused by suspending the weight of the inner conductor 14' along; i.e., insulating member 34 is wrapped around support member 32 as well as wrapped so as to be slung around inner conductor 14' in a geometric arrangement while under a predetermined tension determined from the physical characteristic of the insulating material.

Referring again now to FIG. 1, inner conductor 14', support member 32 and insulating means 30 would be disposed within particle trapping ring 22 to provide a gas insulated transmission line constructed according to the teachings of the invention. Support member 32 would be secured to particle trapping ring 22 by typical methods such as, for example, welding; or particle trapping ring 22 could be designed so as to function as a support member, or, of course, insulating member 34 might be secured directly to outer sheath 12. Whatever retaining means is used to retain insulating member 34, whether support member 32, particle trap 22 or the outer conductor or sheath 12, it can be appreciated by reference to FIGS. 1 and 2 that insulating means 30 provides large insulating gas filled portions of the radial space between the outer and inner conductors without sacrificing mechanical strength of the insulating means.

Figure 3:
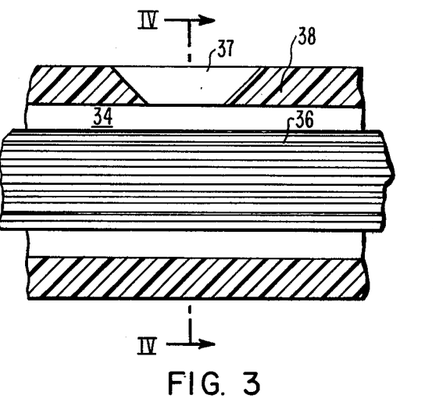
FIG. 3 is an enlarged longitudinal cross sectional view of a portion of the insulating member of FIG. 2.
Figure 4:
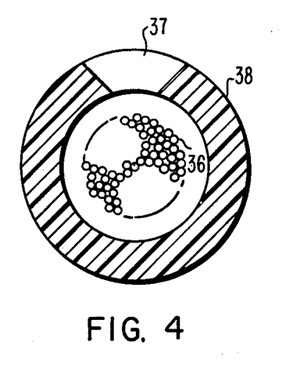
FIG. 4 is a cross sectional view taken along the lines IV—IV of FIG. 3.

Referring now to FIGS. 3 and 4 there is shown an enlarged longitudinal and vertical cross sectional view, respectively, of a portion of insulating member 34 of FIG. 2. Insulating member 34 includes an inner flexible insulating cable 36 and an outer flexible insulating cover 38 which functions as a protective cover for inner flexible insulating cable 36. Besides being flexible in order to facilitate wrapping of insulating cable 36 about the inner conductor, insulating cable 36 should exhibit a high tensile modulus: (ratio of percent elongation divided by stress $$\frac{\delta l/l}{\text{force/area}}$$

i.e. stiffness or low stretch for a given load) as well as high tensile strength, i.e. a small cross section for a given maximum load. In addition, it would be desirable for insulating member 34 to have a low dielectric constant, to contain minimum cavities, to allow every space not occupied by a solid to be filled with a strong insulating gas, to have acid resistance, low creep, to be noncarbonizing, and to resist electric arcs in the insulating cable. It was because of these additional desired characteristics that a two member insulating cable such as insulating member 34 was chosen, although the teachings of the invention, it is to be understood, are not limited to a two member cable. Inner flexible insulating cable 36 is made from an aromatic polyamide material sold under the trademark Kevlar by The DuPont Corporation and has the required high tensile modulus and high tensile strength, as well as exhibiting a lower dielectric constant and acid resistance. Inner flexible insulating cable 36 in addition was made from a filamentary aromatic polyamide material such as Kevlar so a to minimize the possibility of cavities within the insulating filaments. The insulating filamentary material is also conductive to having the insulating gas completely fill the spaces and voids that may occur between the filaments. The outer flexible insulating covering 38 was made from a perfluorocarbon polymer material such as, for example, sold under the trademark Teflon, also by DuPont Corporation, and functions as a protective covering for the Kevlar inner flexible insulating cable. The Teflon material is ablative when subjected to arcing, the rapid evaporation of the small surface area pushing the arcing away from itself thereby functioning very efficiently as a protective covering. The Teflon material also is noncarbonizing when arcing occurs and is a low dielectric constant insulating material. Referring again now to FIGS. 2, 3 and 4 there are shown apertures 37 to facilitate complete filling of all voids within insulating member 34 by the insulating gas such as $SF_6$.

Referring again now to FIG. 2, it can be appreciated that since insulating member 34 is wrapped under tension between inner conductor 14' and support member 32, insulating member 34 restrains the inner conductor 14' from movement in any radial direction while still permitting limited axial movement so as to provide for temperature differential expansion and contraction of the inner and outer conductors without undue stress placed upon the structural elements of the gas insulating transmission line 10. It can also be readily appreciated that this same phenomenon of providing for limited axial movement while restraining any appreciable radial movement would apply if insulating member 34 were wrapped between the inner and outer conductors directly or were wrapped between a support member alone or serving as a particle trap etc. The mechanical support for the insulating means, that is the support member 32, whether it be inserted within a particle trap or inserted directly within the outer conductor, may be made from an insulating material or from metallic material. A metallic material, that is aluminum, was selected for support member 32 in the preferred embodiment since during tests a support member made from the metallic material performed better for a voltage withstand test with a minimum production of arcing. A nonmetallic or insulative material support member is subject to the same disadvantages of the cast insulator; that is, the electrical phenomena of tracking and treeing which again, similarly to cast insulators, is increased by any voids that may be within the material.

Figure 5:
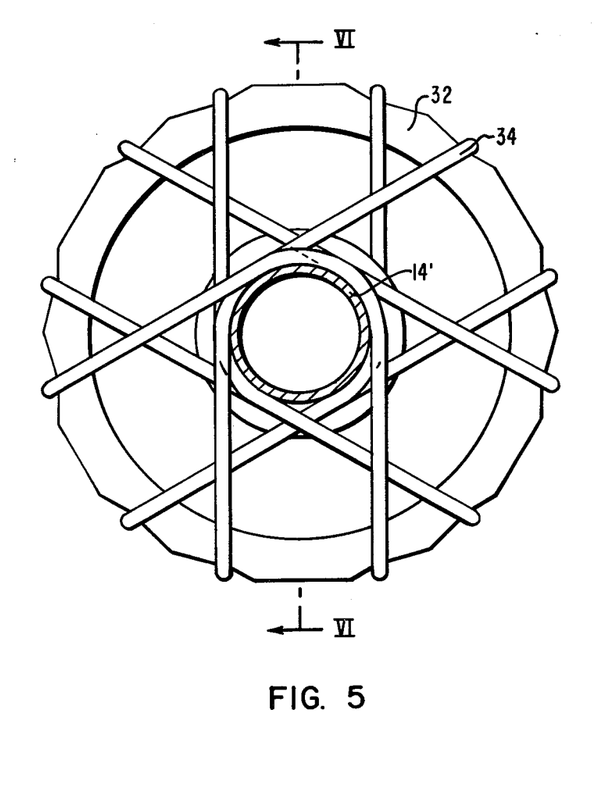
FIG. 5 is an end view of FIG. 2.
Figure 6:
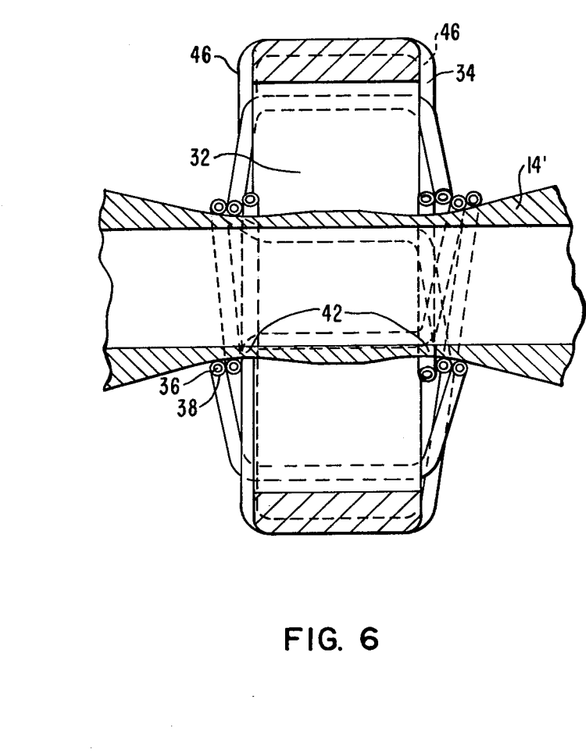
FIG. 6 is a cross sectional view taken along the lines VI—VI of FIG. 5.

Referring now to FIGS. 5 and 6, there are shown an end view of FIG. 2 and a cross sectional view taken along the lines VI—VI of FIG. 5, respectively. The cross section of inner conductor 14' in FIG. 6 illustrates that the inner conductor 14' may be necked down such as, for example, by rolling or machining to produce two regions of reduced diameter 42 along inner conductor 14' so as to provide two regions of reduced electric field in which to locate the insulating member 34. This is not essential to the teachings of the invention since the dielectric member 34 may be wound along a cylindrical inner conductor such as, for example, conductor 14 just as well, but locating the mechanical support in regions of reduced electric field does provide the advantage of a less propensity for arcing as explained further in patent application Ser. No. 244,587 filed Mar. 17, 1981, entitled Flexible Gas Insulated Transmission Line Having Regions of Reduced Electric Field, by Cookson et al., now U.S. Pat. No. 4,370,511, assigned to the same assignee as the present invention and hereby referred to and incorporated herein. FIG. 6 also illustrates that insulating member 34 is wrapped between inner conductor 14' and support member 32 so that insulating member 34 is disposed in approximately two planes or cones 46 perpendicular to the inner conductor 14' at the location of each of the reduced diameter portions 42, the insulating member 34 being joined between the two approximately perpendicular planes or cones by wrapping the insulating member 34 over the support member 32 in a direction parallel to the inner conductor 14'. FIG. 5 then illustrates an end view of one of the approximately perpendicular planes 46 wherein multiple strands of insulating member 34 comprising insulating means 30 are located. FIG. 5 illustrates that insulating member 34 is wrapped around the inner conductor so as to be slung around a predetermined radial angle of the inner conductor and extends to the circumference of support member 32 which in the preferred embodiment has a polygonal structure, specifically a hexagon, having grooves disposed on the outer periphery so as to restrain insulating member 34 at predetermined positions. It follows, of course, that just as support member 32 may constitute the particle trap, the outer conductor or a metallic or nonmetallic insulating member, the teachings of the invention are not limited to any particular geometric shape that it may constitute. A hexagonal structure was chosen for the preferred embodiment simply because it located the insulating members 34 at the selected peripheral locations.

Figure 7:
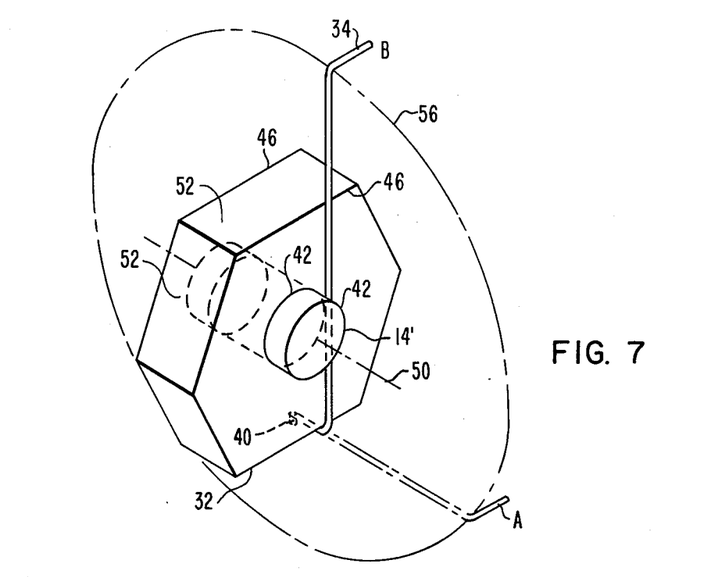
FIGS. 7, 8, 9 and 10 are schematic views of the inner conductor, support member and insulating means of FIG. 2 showing various stages of the method of wrapping the insulating member of FIG. 2 according to the teachings of the invention.
Figure 8:
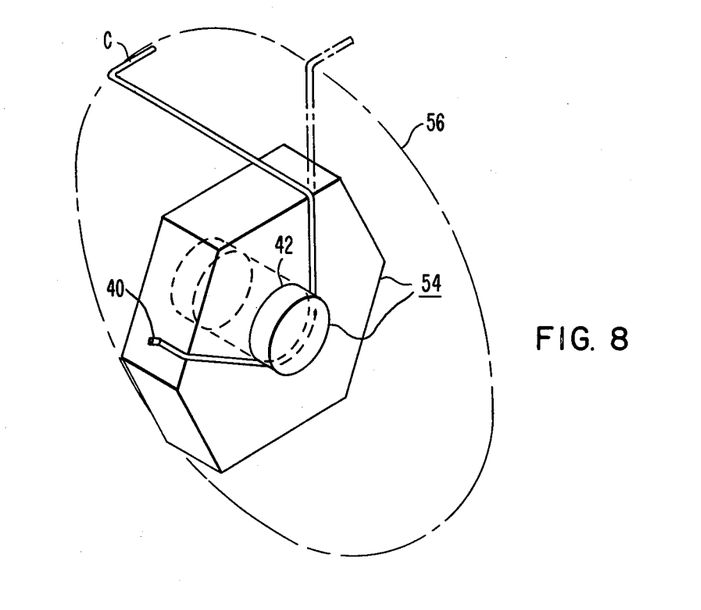
Figure 9:
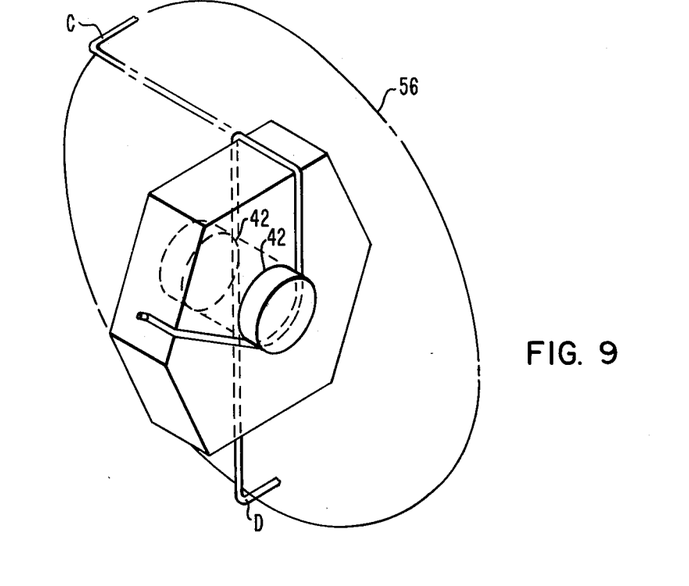
Figure 10:
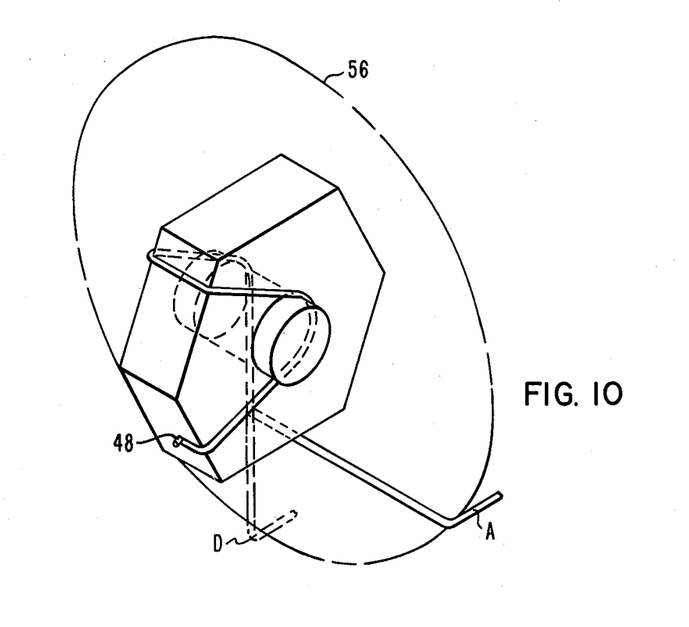

Referring now to FIGS. 7-10 there will be described a method for winding insulating member 34 around inner conductor 14' and support member 32 so as to suspend inner conductor 14' within the support member 32 according to the teachings of the invention. The first step, of course, is to secure inner conductor 14' to support member 32 by means of a removable jig, as is well known in the art, forming inner conductor/support member assembly 54. Referring now to FIG. 7 insulating member 34 would be physically attached to support member 32 at point 40 such as, for example, by gluing or physically tying to a projection disposed in the outer periphery of support member at point 40 etc. Please note that point 40 as well as the location of insulating member 34 along the outer periphery of support member 32 is located a predetermined distance transverse to the axis 50 of inner conductor 14' or gas insulated transmission line 10 equal to the radius of inner conductor 14'. This provides that insulating member 34 always approaches or leaves inner conductor 14' at a point of tangency as well as provides that when insulating member 34 is wrapped around the outer periphery of support member 32, it will approach the outer periphery 52 of support member 32 in a perpendicular direction and will cross the outer periphery 52 of support member 32 in a direction parallel to axis 50 of inner conductor 14'. Insulating member 34 is then placed in a predetermined tension determined from the mechanical characteristics of the material and degree of stress imposed and will remain in tension during the entire method of production of insulating means 30. During the entire wrapping process insulating member 34 may be, for example, payed off a feed reel placed under such predetermined tension. After securing at point 40, insulating member 34 is brought up to tangentially contact conductor 14' by rotation in plane 56 from point A to point B. Referring now to FIG. 8, there is illustrated inner conductor/support member assembly 54 rotated clockwise a predetermined angle such as, for example, in the preferred embodiment, 120°, without any further rotation of insulating member 34 in the plane 56; and then insulating member 34 is rotated in a transverse plane 56 in a counterclockwise direction to point C across periphery 52 of support member 32 in a direction parallel to axis 50 of inner conductor 14'. Referring now to FIG. 9, insulating member 34 continues to rotate in a counterclockwise direction within transverse plane 56 to point D so as to be located in the approximately perpendicular plane or cone 46 on the other side of support member 32 so as to again tangentially contact inner conductor 14' at the location of reduced diameter region 42 as well as contact support member 32. Referring now to FIG. 10, insulating member 34 now remains at point D while inner conductor/support member assembly 54 is rotated counterclockwise through a second predetermined angle such as, for example, 60°, as used in the preferred embodiment. Insulating member 34 is then rotated further in the counterclockwise direction within transverse plane 56 back to the starting point A wherein the method outline in FIGS. 7-10 would be repeated until the geometric pattern of insulating means 30 shown in FIG. 2 results, wherein insulating member 34 would then be attached to support member 32 at point 48 either by gluing or by physically securing to the projecting stud; or insulating member 34 may be secured or attached to itself at point 48. Insulating member 34 may be secured to support member 32 at each point of crossing the outer periphery 52 such as, for example, by gluing or other physical attachment means so that a single break in insulating member 34 would not allow the whole winding of insulating member 34 to unravel.

Figure 11:
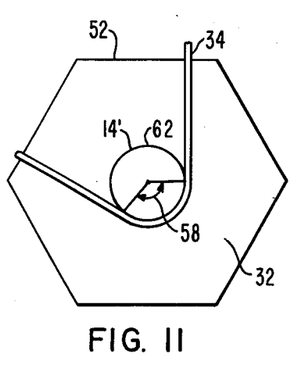
FIG. 11 is a schematic view of one side of the inner conductor support member and insulating cable wrap of FIGS. 7-10 showing the radial angle intercepted on the inner conductor when the insulating cable is slung around the inner conductor as well as the transverse positioning of the insulating cable on the support member.
Figure 12:
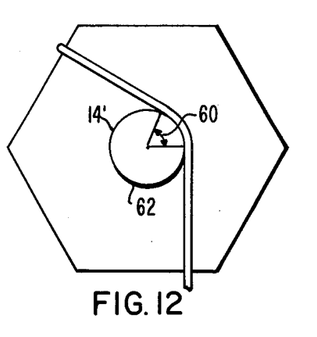
FIG. 12 is a schematic view of the other side of the inner conductor support member and insulating cable of one wrapping of the insulating cable according to the teachings of FIGS. 7-10 showing the radial angle intercepted on the inner conductor on the other side of the support member as well as the transverse positioning of the insulating cable or member along the support member.

Referring now to FIGS. 11 and 12, there is illustrated that insulating member 34 is slung around inner conductor 14' at two different predetermined radial angles 58 and 60 which may be, for example, 120° and 60°, respectively, or any other selected angles which may be desired. The radial angle which insulating member 34 is slung around inner conductor 14 on either side of support member 32 may be selected to any predetermined angle by simply rotating inner conductor/support member assembly 54 through a corresponding angle in either the clockwise or counterclockwise direction during the winding process. FIGS. 11 and 12 also illustrate that insulating member 34 approaches outer periphery 52 of support member 32 from a perpendicular direction so as to cross the outer periphery 52 in a direction parallel to the axis 50 of inner conductor 14' so as to provide that insulating member 34 should only be subjected to longitudinal tension throughout insulating means 30.

Figure 13:
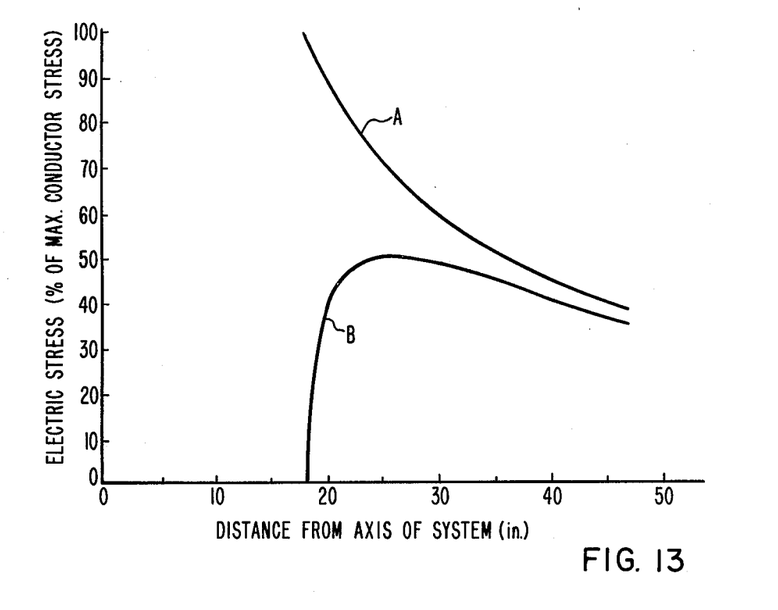
FIG. 13 is a graph of the electric stress versus distance from the axis of a typical gas insulated transmission line showing the radial stress in the absence of an insulator for a typical gas insulated transmission line as well as the longitudinal stress along the insulating cable or member of the insulating means constructed according to the teachings of the invention.

FIGS. 11 and 12 also illustrate that whether insulating member 34 consists of one fiber or is multifilamentary as in the preferred embodiment of the invention, the fibers are disposed transverse to the electric field within the gas insulated transmission line, which electric field is produced in the radial direction between the inner conductor 14' and the outer conductor 12. Since insulating member 34 is disposed at a predetermined transverse angle to the electric field, which predetermined angle may be selected by varying the clockwise and counterclockwise predetermined angles in which inner conductor 14' is rotated, as well as the location of insulating member 34 along the periphery 52 of support member 32 during the winding of insulating means 30, the component of the electric field along the longitudinal length of insulating member 34 is small compared with the total electric field. Insulating member 34 or the fibers of an insulating cable, such as inner flexible insulating cable 36, leave the conductor surface 62 at a tangent; therefore, the theoretical fiber longitudinal electric stress is zero. The theoretical longitudinal fiber electric stress and the total electric stress for the geometry shown in FIG. 2 are illustrated in FIG. 13, a graph of electric stress versus distance from the axis of a system. The low values of longitudinal electrical stress along insulating member 34, particularly at the region along the surface of inner conductor 14', are particularly important for preventing the electrical phenomenon of tracking. (Please note FIG. 13 is calculated for the case of an insulating material for polygonal support member 32 for simplicity). If a conducting material for support member 32 is considered, the conductor varies circumferentially and the design of insulating means 30 illustrated in FIG. 2 has the advantage that insulating member 34 leaves the conductor surface at points where the electrical stress is at a minimum.

Figure 14:
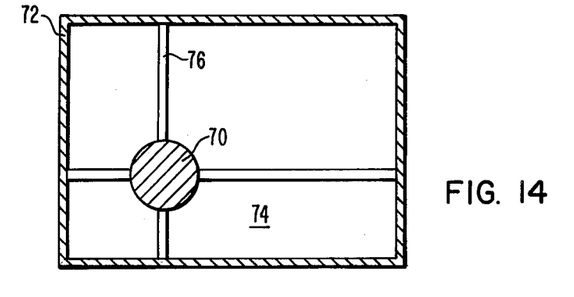
FIG. 14 is a cross sectional view of another embodiment of the invention.

A gas insulated transmission line application of the teachings of the invention is illustrated throughout this specification because the present invention solved certain problems inherent to gas insulated electrical equipment. The invention, however, is broadly applicable to any insulating means disposed within an insulating fluid, gas or vacuum between a high voltage conductor and a support member for suspending the high voltage conductor within the support member by an insulating member tensioned to a predetermined amount greater than the tension caused by suspending the weight of the high voltage conductor alone. The geometric shape of the insulating means or the means for securing the insulating member to the inner conductor or support member likewise is not limited to any particular configuration. These principles of the wide application of the teachings of the invention are illustrated in FIG. 14 wherein there is shown a cross section of a high voltage conductor 70 suspended within a support member 72 by an insulating means 74 disposed between high voltage conductor 70 and support member 72 for suspending the high voltage conductor 70 within the support member 72 by a tensioned electrical insulating member 76 tensioned to a predetermined amount greater than the tension caused by suspending the weight of high voltage conductor 70 alone. Support member 72 may represent the tank or support frame for a high voltage transformer or circuit breaker, or a support member of a high tension air insulated overhead transmission line. Likewise, high voltage conductor 70 may represent the capacitive plates of a high voltage capacitor, windings of a high voltage transformer, electrodes of a high voltage circuit breaker, or even the high voltage conductor of an overhead air insulated transmission line.

In conclusion, there has been disclosed a unique insulating means for suspending a high voltage conductor within a support member by a tensioned insulating member. This arrangement for an insulating means has a number of advantages over a cast insulator, quite apart from the great strength and rigidity and other characteristics that may be obtained from material selection. The larger number of insulating members and smaller cross section of each member combined with the lower dielectric constant of the Kevlar insulating material (3.5 compared with that for cast resin with filler about 5) results in a markedly smaller disturbance of the electric field than is the case for a filled cast resin insulator. The avoidance of any solid resin in regions to be subjected to electric fields eliminates the possibility of forming cavities into which an insulating gas may not be able to penetrate, and in which the gas pressure may remain low, allowing destructive discharges. The insulating member or the fibers comprising the insulating member are disposed at a predetermined angle to the electric field so that the component of the electric field along the longitudinal insulating member length is small compared with the total electric field within the gas insulated equipment. In fact, the insulating member leaves the high voltage conductor surface at a tangent in the preferred embodiment, for which the theoretical longitudinal electrical stress along the insulating member is zero. The method of construction of the insulating means according to the teachings of the invention allows consistent manufacture on automatic machinery. In case an insulator of the present invention would be rejected on account of an error in manufacture or defective materials, the "dry type" construction allows remanufacture without repreparation of the conductor or support frame. The insulating means of the present invention avoids all welding operations on the inner and outer conductors, but nevertheless results in a firm attachment between the inner conductor and the insulator. Particle traps may be attached easily to the support member or frame. The support member or frame is suitable for grounding, or it may be made of insulating material. The insulating means according to the present invention does not involve the liquid resins in regions which are going to be stressed electrically, and hence it avoids the presence of stressed electrically-weak cavities. The disturbance of the electric field due to the presence of the insulating means in service will be less than that for a conventional filled cast-resin insulator because of the smaller volume of insulation material involved, and also because of that material's lower dielectric constant. Changes in winding pattern are quick and inexpensive compared with the cost of design and manufacture of new casting molds. One winding machine can make a variety of sizes of insulator. In contrast, a different mold is needed for each size of cast insulator. Winding an insulator may be feasible in a period of minutes, compared with many hours of vacuum pumping, heating, mixing, curing and post-curing involved in casting. Considerable savings in labor-costs should be possible. Winding of the insulating means according to the present invention is energy efficient, since preliminary heating of molds and resins, running of vacuum pumps, curing and post curing are eliminated. The mechanical support for the inner conductor may be applied to a part of the inner conductor having the lowest electric stress. The insulating member also contacts a metallic support frame at a region of low stress. Alternatively, the support frame may be made of insulating materials. The use of an outer flexible insulating protective covering such as, for example, Teflon or PTFE or other discharge resistant flexible plastic tubing surrounding an inner flexible load bearing plastic filamentary insulating cable such as, for example, Kevlar will have the following benefits:

(A) Occasional stray filaments will be confined within the protective tubing and will be prevented from offering alternative low-strength breakdown paths.

(B) Flashover arcs will be excluded from contacting the load bearing filamentary insulating material. (C) Arcs in contact with the outside of the plastic tube will cause ablation of the tube. The ablated material consists of gas which also has a high electric strength, and its production tends to push the arc away from the surface of the tube, thus inhibiting further damage to the tube.

(D) Both the filament and tube materials selected for the preferred embodiment have low dielectric constants and cause little disturbance to the electric field. Both are available commercially.

(E) The tube material does not carbonize on arcing in $SF_6$, and the new surface exposed by the loss of ablative material has a high electric strength almost equal to that of the original surface.

Although many advantages result from the selection of the materials of the preferred embodiment, the teachings of the invention are by no means confined to insulating members made from these materials but rather the invention is broadly applicable to the selection of any insulating material which may be tensioned.

I claim:

1. A gas insulated transmission line comprising:
a hollow outer conductor;
an inner conductor adapted for connection to an energizing source and disposed interiorly within said outer conductor;
an insulating gas disposed within the annular space between said outer and inner conductors;
insulating means comprising an insulating member disposed between said outer and inner conductors at a predetermined location for suspending said inner conductor within said outer conductor, said insulating member being tensioned to a predetermined amount greater than the tension caused by suspending the weight of the inner conductor alone, said inner conductor being suspended concentrically within the outer conductor, said tensioned insulating member disposed so as to provide tension components in at least two opposite directions and to provide approximately equal tension components in two additional opposite directions perpendicular to said first predetermined opposite directions to restrain the inner conductor from movement in any radial direction while still permitting limited axial movement so as to provide for temperature differential expansion and contraction of the inner and the outer conductors without undue stress; and
a support framework disposed proximate the outer conductor and wherein the inner conductor has two adjacent portions of reduced diameter disposed proximate the axial location of either side of said support framework and wherein said tensioned insulating member is wrapped between said support framework and said reduced diameter portions of said inner conductor and wherein said insulating member is wrapped over said support framework in a direction parallel to said inner conductor, said reduced diameter portions along said inner conductor reducing the electric field at the critical insulating member/inner conductor interface.

2. The gas insulated transmission line of claim 1 wherein said support framework is a polygonal frame having support means disposed on the outer periphery adjacent the corners thereof and said tensioned insulating member is disposed on said support means so as to secure said tensioned insulating member at predetermined locations along the periphery of said support framework.

3. The gas insulated transmission line of claim 2 wherein said polygonal frame is a hexagon having six outer faces and the support means are located a transverse distance from the center line of the gas insulated transmission line substantially equal to the radius of the surface of the inner conductor to locate the tensioned insulating member perpendicular to the outer faces of said hexagonal frame where the insulating member wraps over the frame.

4. The gas insulated transmission line of claim 3 wherein the tensioned insulating member is slung around the inner conductor at the location of the reduced diameter portions so as to intersect a radial angle of 60° C. at one reduced diameter portion and 120° at the other reduced diameter portion.

5. The gas insulated transmission line of claim 4 wherein the tensioned insulating member comprises a multiplicity of flexible insulating filaments having a high tensile modulus, high tensile strength, and low dielectric constant surrounded by a vented insulating noncarbonizing ablative tubing material having a low dielectric constant for confining said flexible insulating filaments and for protecting said multiplicity of insulating filaments from arcs within the gas insulated transmission line and for permitting the insulating gas disposed within the annular space between the outer and inner conductors to enter the interstices between said filaments.

6. The gas insulated transmisson line of claim 5 wherein said high tensile filaments are made of an aromatic polyamide material and said vented insulating tubing material which surrounds said high tensile filaments is made from polytetrafluoroethylene.

7. A gas insulated transmission line, comprising:
(a) a hollow outer conductor;
(b) an inner conductor adapted for connection to an energizing source and disposed interiorly within said outer conductor;
(c) an insulating gas disposed within the annular space between said outer and inner conductors;
(d) filamentary insulating means comprising insulating filaments for insulatably supporting said inner conductor within said outer conductor, said filamentary insulating means including a multiplicity of insulating filaments forming an insulating cable placed in tension so as to suspend said inner conductor within said outer conductor, said tensioned insulating cable being wrapped between the inner and outer conductors to restrain the inner conductor from movement in any radial direction while still permitting limited axial movement so as to provide for temperature differential expansion and contraction of the inner and outer conductors without undue stress placed upon the structural elements of the gas insulated transmission line; and
(e) a cable securing framework disposed proximate the outer conductor and wherein the inner conductor has two adjacent regions of reduced radius disposed proximate the axial location of either side of said cable securing framework and wherein said tensioned insulating cable is slung around said inner conductor at said reduced radius regions and disposed between said inner conductor at said reduced radius regions and said securing framework and wherein said insulating cable is joined by wrapping said insulating cable over said securing framework in a direction parallel to said inner conductor.

8. The gas insulated transmission line of claim 7 wherein the tensioned insulating cable is disposed between said inner conductor and said outer securing framework transverse to the electrical field between said inner and outer conductors so as to provide for reduced electrical stress along the longitudinal length of the tensioned insulating cable.

9. The gas insulated transmission line of claim 7 wherein said securing framework has a polygonal structure having support means disposed on the outer periphery adjacent the corners thereof and said tensioned insulating cable is disposed on said support means so as to secure said cable at predetermined radial locations along the outer periphery of said outer securing framework.

10. The gas insulated transmission line of claim 9 wherein the tensioned insulating cable is slung around the inner conductor at the location of the reduced radius regions so as to be slung around and intersect a radial angle of 60° at one reduced radius region and be slung around and intersect a radial angle of 120° at the other reduced radius region.

11. The gas insulated transmission line of claim 10 further including a vented insulating tube surrounding said tensioned insulating cable for confining said filaments and protecting said filaments from possible arcs within the gas insulated transmission line.

12. The gas insulated transmission line of claim 11 wherein the multiplicity of tensioned insulating filaments have a high tensile modulus, high tensile strength, and low dielectric constant and wherein the vented insulating tube surrounding said insulating filaments has a low dielectric constant, is noncarbonizing and ablative, and is vented so as to permit the insulating gas disposed within the annular space between the inner and outer conductors to enter the interstices between said tensioned insulating filaments.

13. The gas insulated transmission line of claim 12 wherein said tensioned insulating filaments are made of aromatic polyamide material and said vented insulating tubing which surrounds said tensioned insulating filaments is made from a perfluorocarbon polymer material.

14. The gas insulated transmission line of claim 13 wherein said perfluorocarbon polymer material is polytetrafluoroethylene.

15. A method of forming an electrical insulator between an electrical conductor and a support member, comprising the steps of:
(a) securing said conductor at a predetermined location within said support member by means of a removable jig;
(b) securing one end of a flexible electrical insulating member to said support member;
(c) placing the remainder of said flexible electrical insulating member under tension;
(d) wrapping said flexible insulating member around said conductor and said support member in a predetermined geometric arrangement;
(e) securing the other end of said flexible electrical insulating member to said support member so that said flexible electrical insulating member is in tension along its entire longitudinal length; and
(f) removing said removable jig.

16. The method of claim 15 wherein the wrapping step further includes the steps of rotating said secured conductor/support member assembly first in a predetermined direction through a first predetermined angle and then in the opposite direction through a second predetermined angle and simultaneously rotating said flexible electrical insulating member so as to rotate the flexible insulating member in a second predetermined direction perpendicular to both of said directions of rotating said conductor/support member assembly.

17. The method of claim 15 where the step of securing the other end of said flexible insulating member further includes tying this end of the flexible insulating member to the other end of the flexible insulating member that was secured in step (b).

18. The method of claim 15 further including the step of securing the flexible insulating member to the support member wherever the two members come in contact.

19. An electrical device, comprising:
support means for supporting an electrical conductor;
a first conductor adapted for connection to an electrical potential and disposed interiorly within said support means; and
a flexible insulating member disposed between said support means and said first conductor suspending said first conductor within said support means, said insulating member being tensioned to a predetermined amount greater than the tension caused by suspending the weight of the first conductor alone, said insulating member comprising a flexible inner member having a high tensile modulus, high tensile strength, and low dielectric constant surrounded by a flexible insulating tubular outer member having a low dielectric constant confining said flexible inner member.

20. The device of claim 19 wherein said inner member is comprised of a multiplicity of flexible insulating filaments.

21. The device of claim 20 wherein said outer member is comprised of an insulating noncarbonizing ablative tubing material.

22. The device of claim 21 wherein said outer member is vented.

23. The device of claim 20 wherein said filaments are made of an aromatic polyamide material.

24. The device of claim 19 wherein said outer member is comprised of an insulating noncarbonizing ablative tubing material.

25. The device of claim 24 wherein said outer member is made of polytetrafluoroethylene.

26. The device of claim 19 wherein said first conductor has a reduced diameter portion and said insulating member contacts said first conductor at said reduced diameter portion.

27. An electrical device comprising:
support means for supporting an electrical conductor;
a first conductor adapted for connection to an electrical potential and disposed interiorly within said support means, said first conductor having a reduced diameter portion thereof; and
a flexible insulating member disposed between said support means and said first conductor reduced diameter portion suspending said first conductor within said support means, said flexible insulating member being tensioned to a predetermined amount greater than the tension caused by suspending the weight of the first conductor alone.

28. The device of claim 27 wherein said tensioned insulating member is disposed to provide tension components in at least two opposite directions.

29. The device of claim 27 wherein said tensioned insulating member extends at least partially circumferentially about said reduced diameter portion.

30. The device of claim 27 wherein said tensioned insulating member comprises an inner member made of a multiplicity of flexible insulating filaments and a tubular outer member surrounding said inner member and made of an insulating noncarbonizing ablative material.

* * * * *